United States Patent [19]

Furmaga

[11] 4,429,581
[45] Feb. 7, 1984

[54] MULTIPHASE FLOW MEASUREMENT SYSTEM

[75] Inventor: Robert E. Furmaga, New Orleans

[73] Assignee: Baker CAC, Inc., Belle Chasse, La.

[21] Appl. No.: 267,276

[22] Filed: May 26, 1981

[51] Int. Cl.³ .................. G01F 13/00; E21B 47/00
[52] U.S. Cl. ............................ 73/861.04; 73/155; 73/195; 73/200; 73/203
[58] Field of Search ............... 73/61.1 R, 195, 198, 73/200, 202, 203, 861.04, 155

[56] References Cited

U.S. PATENT DOCUMENTS

| | | | |
|---|---|---|---|
| 3,488,996 | 1/1970 | Pfrehm | 73/195 X |
| 3,525,258 | 8/1970 | Fowler et al. | 73/198 X |
| 3,638,476 | 2/1972 | Paterson et al. | 73/61.1 R |
| 4,168,624 | 9/1979 | Pichon | 73/195 |

Primary Examiner—Charles A. Ruehl
Attorney, Agent, or Firm—Norvell & Associates

[57] ABSTRACT

A multiphase flow measurement system determines the individual total flow rates of the water, gas, and oil components in a production fluid mixture from a subterranean well. The system includes a mass flow measurement unit which is coupled to the outlet of the well for measuring a total mass flow rate of the production fluid mixture. After the mass flow rate has been measured, a sample portion of the production fluid is supplied to a test separator tank system which is utilized to determine individual sample flow rates of the water, gas, and oil components in the sample portion of the production fluid. A central control unit is responsive to the individual sample flow rates and the mass flow measurement for determining the individual total flow rates of the water, gas, and oil components at the well head.

10 Claims, 1 Drawing Figure

MULTIPHASE FLOW MEASUREMENT SYSTEM

BACKGROUND OF THE INVENTION

1. Field of the Invention

The present invention relates in general to flow measurement systems for produced fluids from subterranean wells and in particular to a system for measuring the individual flow rates of a group of fluid components commonly found in the production fluid mixture.

2. Description of the Prior Art

Typically, produced fluid from a subterranean well consist of water, oil, and gas components. In most instances, it is desirous to determine at the well head the flow rate of each component of the production fluid. One method of determining the flow rate of these components is to utilize a separator tank which is connected to receive the production fluid from the output of the well. The separator can be either of the three-phase or two-phase type. In the three-phase type, a gas-oil-water separation function is performed by the separator. In the two-phase type, the separation stage performs a gas-liquid separation, and a separate device is utilized to monitor the liquid flow and determine the percentage of oil and water in the liquid. Once the production fluid has been separated into its components, each component can be monitored to determine its individual flow rate.

One of the problems associated with the above-described separator method is that the separator tank typically must be designed to accommodate the full sampled production of the monitored well. This problem is especially acute in off-shore production wells, since a typical off-shore platform is designed to accomodate a 20,000 BPD separator tank. However, the production fluid flow rates of off-shore wells can range as high as 50,000 BPD. In such instances, it is not practicle to utilize the existing separator tank to obtain accurate flow rate measurements.

SUMMARY OF THE INVENTION

The present invention relates to a multiphase flow measurement system which can be utilized to determine the individual flow rates of the water, gas, and oil components of a production fluid mixture. The system includes a mass flow measurement means which is coupled to the outlet of the oil well for measuring the total mass flow rate of the production fluid mixture. A vortex shedding device is provided upstream of the mass flow measurement means to transform the production fluid into a homogeneous mixture to increase the accuracy of the mass flow measurement. After the mass flow rate has been determined, a portion of the production fluid is supplied to a test separator tank while the remaining portion is supplied to a production fluid header connected to the outputs of other, unmonitored wells.

The test separator tank is typically a two-phase separator which separates the production fluid into a gas component portion and a liquid portion. A means, such as a net oil computer, is coupled to the liquid outlet of the separator tank to determine the liquid flow rate along with the percentage of oil and water in the liquid portion. A differential/pressure transmitter monitors the gas flow from the gas outlet of the separator tank.

A central control means is responsive to the mass flow measurement, the oil-water percentage, the separator liquid flow rate, and the separator gas flow rate for determining and displaying in BPD units the individual flow rates of the gas, oil, and water components of the production fluid. The use of the mass flow measurement means provides a flow measurement system wherein the entire production output of the well need not be supplied to the separator tank. The individual component flow rates from the test separator tank can be utilized as sample measurements with the total mass flow measurement to obtain individual component flow rates which correspond to total well production. Such a measurement system is especially advantageous for use in off-shore well production wherein the size of the separator tanks is limited.

BRIEF DESCRIPTION OF THE SINGLE DRAWING

FIG. 1 is a block diagram of a multiphase flow measurement system embodying the principles of the present invention.

DESCRIPTION OF THE PREFERRED EMBODIMENT

Figure 1:
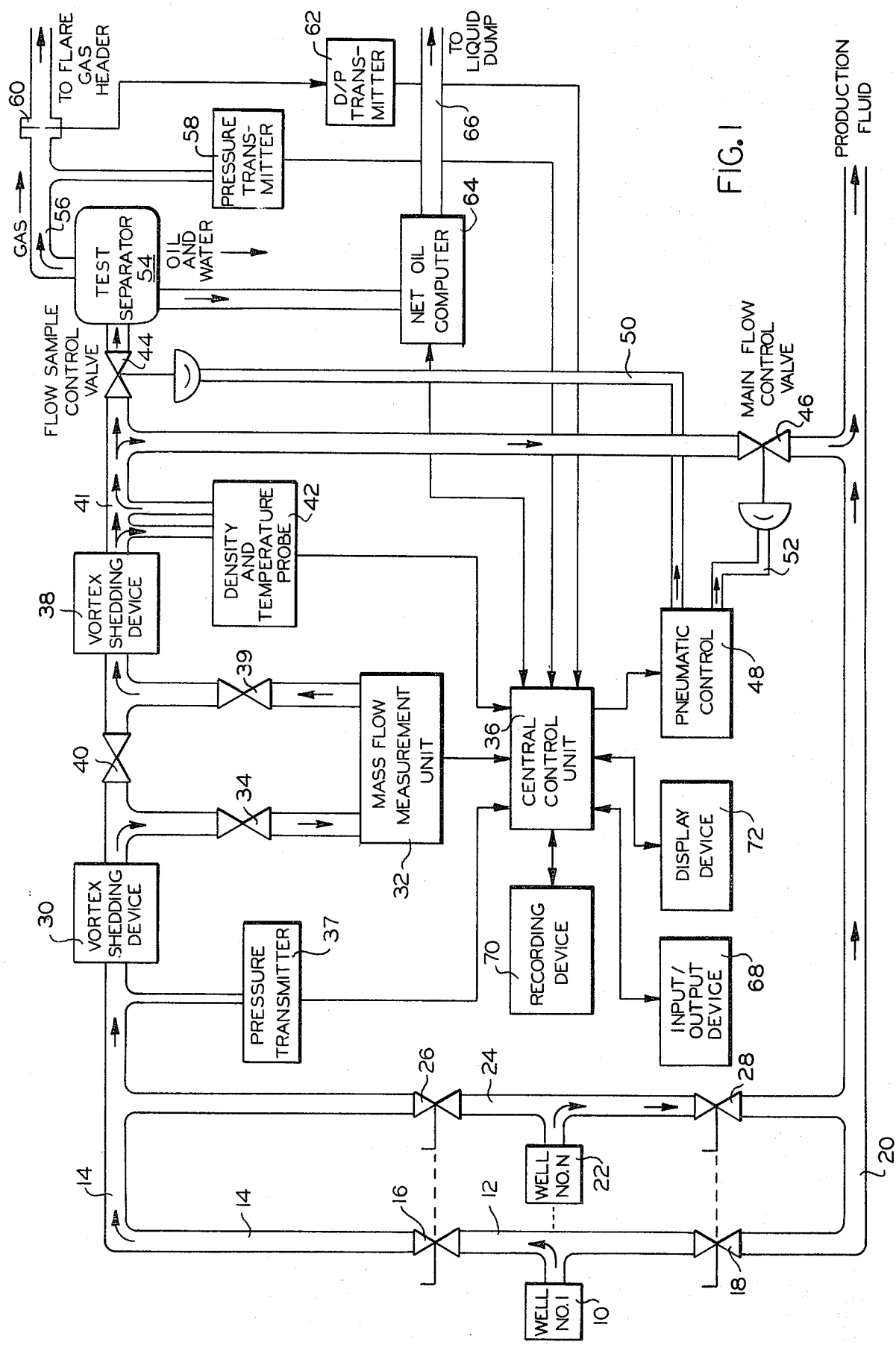

Referring to FIG. 1, there is shown in block diagram form a multiphase flow measurement system. The system can be connected to monitor and provide flow measurement data for a plurality of oil production wells. In FIG. 1, a well No. 1 10 has an output line 12 connected to supply the production fluid from the well 10 to a system input line 14 through a normally open valve 16. A normally closed valve 18 prevents the production fluid from the well outlet 12 from being supplied to a main production header 20. Other production wells can be connected between the system input line 14 and the production header 20 in a similar manner. For example, well No. N 22 has an output line 24 connected to the system input line 14 by a normally closed valve 26. The production fluid from the well 22 is supplied to the production header 20 through a normally open valve 28 connected between the output line 24 and the header 20.

The two valves which are associated with each production well are selectively opened or closed, depending on which well the system is to monitor. For example, when it is desired to monitor the production of a particular well, the valve connected between the well output line and the production header 20 is closed while the valve connected between the well output line and the system input line 14 is opened. At this time, the valves connected between the other well outputs and the system input line 14 will be closed, while the production fluid from the other wells is passed directly to the production header 20 through the respective valves. The well control valves can either be manually or automatically controlled.

The line 14 is connected to supply production fluid to the input of a vortex shedding device 30 which transforms the production fluid into a homogeneous mixture. The vortex device 30 provides an obstruction in the line which produces an eddy in the flow. The eddy creates uniform ripples and results in the production fluid having a more homogeneous mixture.

The homogeneous production fluid mixture is then supplied to a mass flow measurement unit 32 through a normally open valve 34. The mass flow measurement unit monitors the flow of the homogeneous production fluid and generates a signal to a central control unit 36 representing the mass flow rate of the production fluid. The mass flow measurement unit 32 can be a Micro Motion flow meter manufactured by Micro Motion, Inc. of Boulder, Colorado. Such a flow meter can be adjusted to reduce inaccuracies resulting from any liquid slugs which may be present in the production fluid. A pressure transmitter 37 can be provided to sense the pressure in the input line 14 and provide this data to the central control unit 36. The unit 36 can monitor the pressure in the line 14 to insure that the pressure rating of the mass flow unit 32 is not exceeded.

The output of the mass flow measurement unit 32 is connected to the input of a second vortex shedding device 38 through a normally open valve 39. A normally closed valve 40 is connected between the output of the first vortex shedding device 30 and the input of the second vortex shedding device 38. The valves 34, 39, and 40 function as isolation valves to facilitate cleaning or temporary removal of the measurement unit 32. If it is desired to remove the unit 32 for cleaning, the valves 34 and 39 can be closed while the valve 40 is opened to permit the production fluid to pass directly from the first shedding device 30 to the second shedding device 38.

The vortex shedding device 38 functions in a manner similar to the vortex shedding device 30 to further insure the homogenity of the production fluid. The vortex shedding device 38 has an output connected to a line 41. A density and temperature probe unit 42 is connected to monitor the production fluid in the line 41. The unit 42 generates a signal to the central control unit 36 to inform the control unit of these measurements. The unit 42 can be a Model ED 2-01 Electronic Densitometer manufactured by UGC Industries, Inc. of Shreveport, Louisiana.

The line 41 is connected to the input of two adjustable control valves, a flow sample control valve 44 and a main flow control valve 46. Both of the control valves are controlled by a pneumatic control 48 which receives a control signal from the central control unit 36. The pneumatic control 48 generates a first pneumatic control signal to the valve 44 through a line 50 and generates a second pneumatic control signal to the main flow control valve 46 through a line 52.

The output of the flow sample control valve 44 is connected to a test separator tank 54 which is typically a two-stage separator for separating the production fluid into a gas component and a liquid portion. The portion of the production fluid in the line 41 which is not supplied to the test separator 54 is supplied through the main flow control valve 46 to the production header 20. The amount of flow through each of the flow control valves will depend on both the output production rate of the particular well being monitored and the size of the test separator tank 54. For example, if the separator tank 54 is sufficiently large to accommodate the entire production output of the monitored well, the main flow control valve 46 may be closed completely. However, as the production rate of the well exceeds the capacity of the separator tank 54, the excess portion of the production fluid can be supplied to the production header 20 through the main flow control valve 46.

The test separator 54 is connected to supply the separated gas component to an outlet line 56. The pressure in the output line 56 is monitored by a pressure transducer and transmitter 58 which in turn supplies this information to the central control unit 36. An orifice plate 60 is provided in the gas outlet line 56 and is connected to a differential/pressure (D/P) transmitter 62 to monitor the gas flow through the line 56. The gas flow measurement is then supplied by the transmitter 62 to the central control unit 36. The line 56 is connected to the flare gas header of the well (not shown).

The separated liquid portion from the separator 54, which typically comprises oil and water components, is connected to the input of a net oil computer 64 which functions to monitor the liquid flow rate and determine the percentage of oil and water in the liquid portion. The computer 64 can determine this percentage under flowing line conditions as the liquid portion of the separator 54 is supplied to a liquid dump (not shown) by a line 66. The net oil computer 64 communicates with the central control unit 36 to provide the measured information to the unit 36. The computer 64 can be a Model 1200 Net Oil Computer manufactured by ITT Barton of City of Industry, Calif.

Based on the measurements obtained from the mass flow unit 32, the density and temperature probe unit 42, the D/P transmitter 62, and the net oil computer 64, the central control unit 36 can calculate the gas flow, oil flow, and water flow rates of the well on a BPD basis. The mass flow measurement unit provides a signal representing the total mass flow from the well, while the density unit 42, net oil computer 64, and the D/P transmitter 62 provide signals representing the percentage each component comprises of the total mass flow on a sampled basis.

The central control unit 36 can be connected to communicate with a system operator by means of an input/output device 68. The central control unit 36 can also be connected to a recording device 70 which functions to record the calculated information and a display device 72 which can display the individual component flow rates for the operator. The central control unit 36 can be a microcomputer such as a Model No. 8085 manufactured by Intel Corporation of Santa Clara, Calif. The central control unit 36 can alternately be a Provox instrumentation system of the type manufactured by Fischer Controls Company of Marshalltown, Iowa.

In summary, the present invention concerns an apparatus and a method for determining a total flow rate for each of the components of a production fluid mixture from a well. The apparatus includes means coupled to the outlet of the well for measuring a total mass rate of the production fluid mixture, means coupled to receive a sample portion of the production fluid mixture for measuring a sample component flow rate of each of the fluid components in the sample portion, and means responsive to the mass flow rate measurement and the sample component flow rate measurements for determining the total flow rates of the components of the production fluid mixture. Typically, the components are water, gas, and oil.

The method, according to the present invention, includes the steps of measuring the total mass flow rate of the production fluid mixture from the outlet of the well, measuring the flow rates for the components of a sample of the production fluid, and determining the total flow rates for each of the components from the total mass flow rate and the component flow rates.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An apparatus for determining a total flow rate for each of a plurality of fluid components of a production fluid mixture from a subterranean well, comprising: means coupled to an outlet of the well for measuring a total mass flow rate of the production fluid mixture; means coupled to receive a sample portion of the production fluid mixture for measuring a sample flow rate for each one of the fluid components in said sample portion of the production fluid mixture; and means responsive to said mass flow rate measurement means and said sample flow rate measurement means for determining the total flow rate of each one of the fluid components.

2. An apparatus according to claim 1 including a vortex shedding device coupled between the well outlet and said means for measuring a total mass flow rate for transforming the production fluid into a generally homogeneous mixture.

3. An apparatus according to claim 2 including a vortex shedding device coupled between said means for measuring a total mass flow rate and said means for measuring a sample flow rate of each of the fluid components.

4. An apparatus according to claim 1 including means for selectively bypassing said means for measuring a total mass flow rate.

5. An apparatus according to clam 1 wherein said means for measuring a sample flow rate includes a separator tank for separating at least one of said fluid components from said sample portion of the production fluid mixture.

6. An apparatus according to claim 5 wherein said one fluid component is gas and including a differential pressure means responsive to said gas for generating a sample flow rate for said gas.

7. An apparatus according to claim 6 wherein said separator tank separates a liquid portion from said sample portion of the production fluid mixture, and including means for measuring a sample flow rate of said mixture portion.

8. An apparatus according to claim 7 wherein said liquid portion includes oil and water components, and said means for measuring a sample flow rate of the liquid portion includes a net oil computer.

9. An apparatus for determining a total flow rate of at least one fluid component of a production fluid mixture from a subterranean well, comprising: means coupled to an outlet of the well for measuring a mass flow rate of the production fluid mixture; means coupled to receive a sample portion of the production fluid mixture for measuring a sample flow rate of the one fluid component in said sample portion of the production fluid mixture; and means responsive to said mass flow rate measurement means and said sample flow rate measurement means for determining the total flow rate of the one fluid component, the one fluid component being a gas and the remaining production fluid mixture including oil and water components, said means coupled to receive said sample portion measuring an oil sample flow rate of said oil component and measuring a water sample flow rate of said water component.

10. The apparatus of claim 9 wherein said total flow rate of the one fluid component represents a total gas flow rate and said sample flow rate represents a gas sample flow rate, and wherein said means for determining the total flow rate is further responsive to said oil sample flow rate and said water sample flow rate for determining a total oil flow rate of said oil component in said production fluid and a total water flow rate of said water component in said production fluid.

* * * * *